Figure 1:
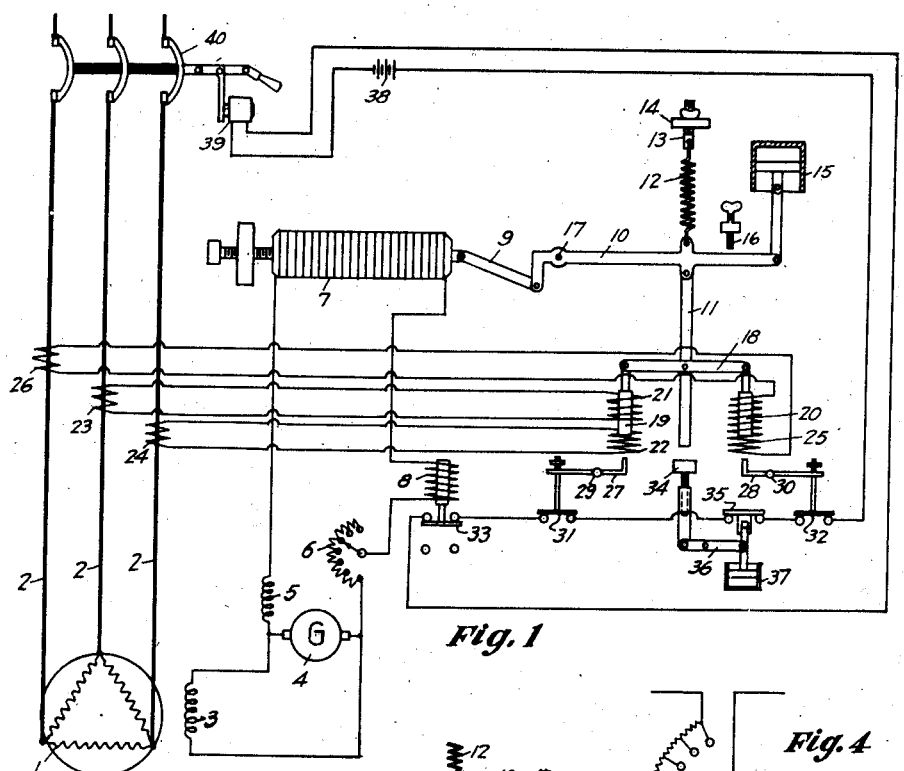

June 13, 1933.  R. E. RICE  1,913,639

REGULATING SYSTEM FOR DYNAMO ELECTRIC MACHINES

Filed Oct. 22, 1931  2 Sheets-Sheet 1

Inventor
Roy E. Rice
By W. S. McDowell
Attorney

INVENTOR.
Roy E. Rice
BY
ATTORNEY.

Patented June 13, 1933

1,913,639

UNITED STATES PATENT OFFICE

ROY E. RICE, OF COLUMBUS, OHIO

REGULATING SYSTEM FOR DYNAMO-ELECTRIC MACHINES

Application filed October 22, 1931. Serial No. 570,430.

This invention relates to a regulating system and apparatus applicable for use in connection with alternating current dynamo-electric machines for controlling power factor characteristics of such machines; the system and apparatus are designed also to provide at the same time: (1) protection against phase failure; (2) protecting against failure of exciting current; and (3) protection against overload on the machine to which the invention is applied.

With regard to the controlling of the characteristic of an alternating current machine, the invention is designed for use particularly with synchronous alternating current machines, and the control is effected substantially by varying the excitation of such synchronous machine or by varying the excitation of the exciter which supplies exciting current to the field winding of the synchronous machine.

In the preferred form of the invention the controlling apparatus is designed to regulate the power factor characteristic of a synchronous motor, although this application is not necessarily limited to use with motors, since the invention can be applied also to generators for voltage regulation and converters. With motors, however, it is believed that the invention will find its widest field of application, or in other words, the apparatus will be of particular utility in controlling the power factor characteristic of a synchronous motor.

A synchronous motor will operate to carry its load with its field excited to a less degree than that for which it was designed, in which case it is said to be an under-excited, or it may also be operated with its field excited to a greater degree than normal, in which case it is said to be over-excited. With either under-excitation or over-excitation, the power factor of the motor is less than unity, or one hundred percent, as it is sometimes spoken of. There is a normal value of excitation at which the power factor is unity. This characteristic is graphically shown in the well known power factor curve of a synchroncus motor.

At unity power factor the motor takes its minimum current from the line or other source of energy which supplies it. For any given load an under-excited motor takes a relatively larger current from the line. Now with the load remaining constant, if the excitation of the motor be increased, the motor will take less current from the line until a minimum value is reached, beyond which, if the excitation be increased still further, the current taken by the motor from the line will increase again. This characteristic is graphically shown in the well known V curve of a synchronous motor.

While there is a value of excitation at which the motor power factor is approximately unity regardless of the amount of load the motor is carrying, and while it is possible to adjust the value of the motor excitation by means of a field rheostat to secure this condition, it is generally found that even with a careful initial adjustment, the power factor will vary as the load varies and it is these variations of power factor which lie beyond manual control and for which the automatic control apparatus herein described is designed to compensate. In other words, a predetermined power factor may be automatically maintained with the use of the present invention as the co-operative motor is operated under varying loads.

When a synchronous motor is operated under-excited the current which it takes from the line is a lagging current, that is, it lags behind the supply voltage in phase. With normal excitation, producing unity power factor, the current is in phase with the voltage. When operated over-excited the motor takes a leading current, or current leading the supply voltage in phase.

Figure 2:
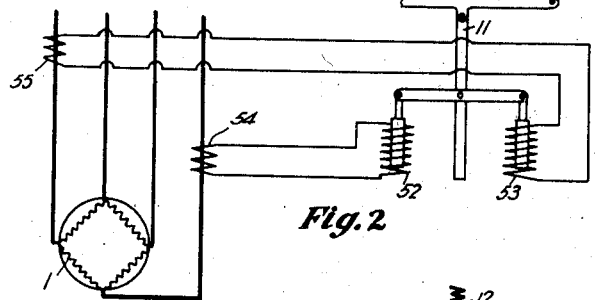
Figure 4:
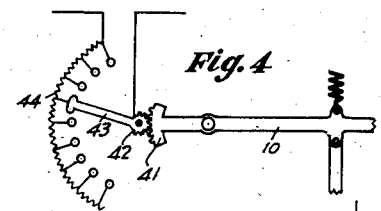
Figure 3:
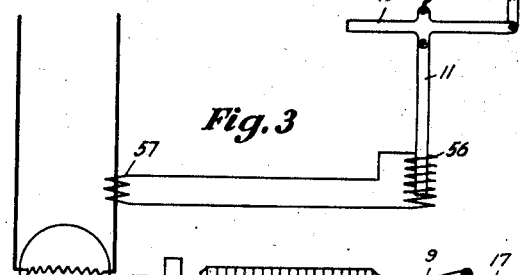
Figure 5:
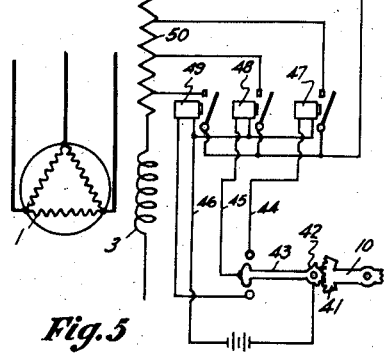
Figure 6:
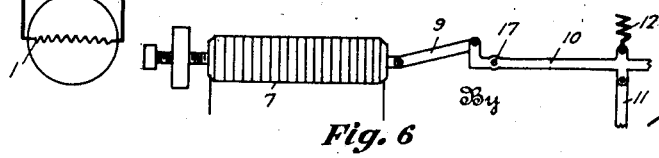
Figure 7:
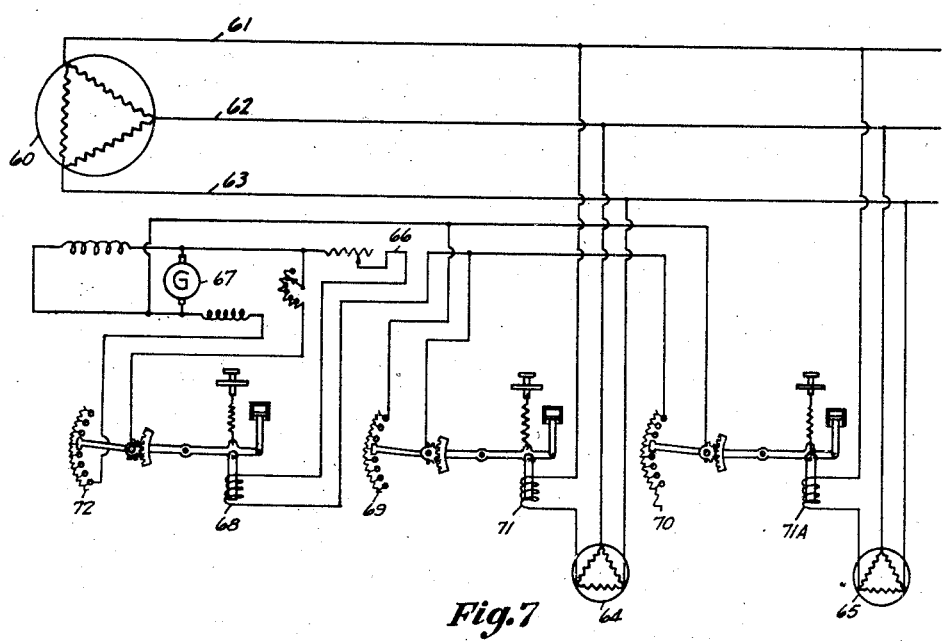
Figure 8:
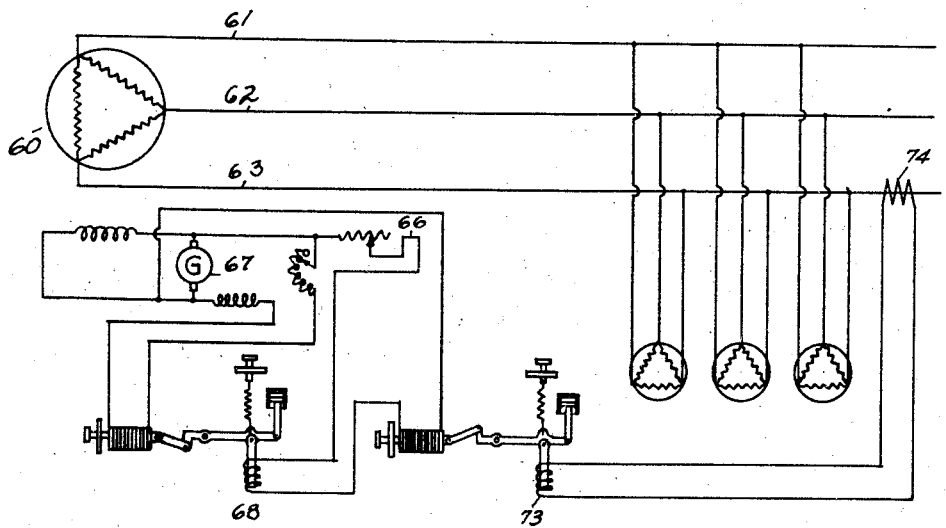

Now, for a further understanding of the invention, reference is to be had to the following description and the accompanying drawings, wherein:

Figure 1 is a diagrammatic view illustrating the control system, comprising the present invention, as used with a motor having over-excitation; a three phase motor is shown which is quite commonly used in practice, Figure 2 is a similar view showing the connections when used with a two phase motor, Figure 3 illustrates a modification of the apparatus as used with but single phased motor, Figure 4 discloses a modification of the rheostat in the exciter field circuit and also its operating bar, Figure 5 is a diagrammatic view showing an application of the control apparatus where it is desired to vary the field current of the exciter motor direct, Figure 6 is a modification showing another arrangement of the connected links attached to the carbon pile rheostat illustrated in Figure 1, Figure 7 is a further modification disclosing the system as used in maintaining a predetermined power factor on an A. C. circuit serving induction or asynchronous motors of varying loads by means of a synchronous condenser, Figure 8 is a diagrammatic modification of the invention.

Referring more particularly to the drawings and to the arrangement of the apparatus disclosed in Figure 1, an alternating current synchronous motor is indicated by the numeral 1 and is shown as connected with the usual supply wires 2, the motor being of the so-called three phase type, although the invention is applicable to dynamo-electric machines of other well known types. In this instance the motor which is provided with a field winding 3, which is energized by a conventional type of exciter 4, the exciter 4 is provided with a shunt field winding 5, in circuit with which is an adjustable rheostat 6 of ordinary form and preferably manually operated, while a rheostat 7 of the carbon pile compression type is provided in connection with the system together with a relay operating coil 8.

The rheostat 7 is connected through a link 9 with an operating lever 10, which carries a pivotally attached bar 11 that is normally supported by a coil spring 12, the tension of the lever being adjustable through a screw 13 and a nut 14. The operating lever 10 is restricted somewhat in its movement by a dash-pot or its equivalent 15, which retards both the upward and downward movement of the lever 10. An adjustable stop 16 also limits the upward travel of the lever 10, the latter being pivotally mounted in any suitable way as indicated by the numeral 17.

The bar 11 carries a pivoted cross-bar 18, from which is pivotally suspended at the opposite ends thereof magnet cores 19 and 20. Surrounding the core 19 are coils 21 and 22 which are connected respectively to current transformers 23 and 24. The core 20 is disposed within a third coil 25, which is connected to a current transformer 26, said transformer being arranged in inductive relationship to the leads 2. Levers 27 and 28 are arranged to be operated by the downward movement of the cores 19 and 20 respectively, and said levers are pivoted as indicated by the numerals 29 and 30. Operation of the levers 27 and 28 results in opening the normally closed contacts 31 and 32, while the movable armature in magnetic coil 8 when de-energized opens the contact 33. The downward movement of the bar 11 is limited by an adjustable stop 34, and the downward movement of said stop 34 results in the opening of the contact 35 by reason of the lever action 36. A dash-pot 37 is connected with the lever arm 36 and the contact 35 and introduces a time limit on the opening and closing of the contact 35. The contacts 33, 31, 35 and 32 are connected in series with a battery or other source of energy designated at 38 and with a holding coil or trip 39 of a circuit breaker 40. This circuit breaker may be of any type which may be opened by de-energizing the coil 39 thereby to cut off the main current supply to the motor 1.

The operation of the control apparatus to maintain any desired value of power factor, that is, any desired value of excitation for a synchronous motor is as follows: With the motor field adjusted so as to give a predetermined power factor with a given mechanical load, as the load on the motor increases the current will lead to a lesser degree behind the supply voltage. To compensate for this lessened degree of lead it is necessary to increase the motor excitation. This is accomplished as follows: When the motor load is increased, the current in coils 21, 22 and 25 increases, pulling the operating lever 10 downwardly against the tension of the spring 12, and compressing the carbon pile rheostat through the link 9. This action decreases the resistance in the exciter field circuit, increases the voltage of the exciter and increases the current in the field of the synchronous motor. This increase in the motor excitation increases the power factor to its former value. Conversely with the motor field adjusted so as to give a predetermined power factor with a given mechanical load, as the load on the motor decreases the current will lead to a greater degree the supply voltage. To compensate for this greater degree of lead, it is necessary to decrease the motor excitation, which is accomplished by the bar 11 raising in response to the spring 12 and to the lessened value of current in the coils 21, 22 and 25, thereby decreasing the compression on the rheostat 7. This increases the resistance in the exciter field circuit; decreases the exciter voltage and decreases the motor excitation. This decrease in motor excitation decreases power factor to its former value. It must be understood that this device is not intended or so designed as to affect power factor beyond that obtained by field saturation of either exciter or motor.

It will be seen that this device will in particular maintain predetermined leading or lagging reactive kilo-volt-amperes when applied to a properly designed synchronous motor carrying varying mechanical loads and will also increase the "pull-out" torque of synchronous motors the same being especially advantageous with great varying loads when the peak exceeds the "pull-out" torque at normal excitation.

In the foregoing it will be understood that the coils 21 and 22 are together equal in pulling power to the coil 25, so that with equal currents in the main conductors the magnetic cores 19 and 20 and the cross-bar 18 are balanced. However, should the currents in conductors 2 become unequal to a degree great enough to overload a portion of the motor winding, or otherwise cause trouble, the control apparatus will act to disconnect the motor from the line. This is accomplished as follows: Assuming that the current introduced in current transformer 26 falls considerably below that in transformers 23 and 24, the action of the coil 25 will be overcome by the combined action of the coils 21 and 22. This allows the core 20 to rise and the core 19 to lower until it engages with the lever 27, opening contact 31. This opens the circuit through the coil 39, allowing the circuit breaker 40 to open and thus disconnect the motor 1 from the line. In a similar way it can be shown that a reduced current in any one of the three conductors 2 will result in cores 19 and 20 engaging their corresponding levers 27 and 28, and opening their respective contacts 31 and 32, resulting in the opening of the circuit breaker 40. By this arrangement the invention provides protection against so-called phase failure.

It is also desirable to protect the motor against excessive current in conductors 2, even though such currents may be balanced. This condition might be caused by an overload on the motor, and it is necessary to disconnect the motor should the overload continue longer than a predetermined interval of time. This result is attained by the control apparatus in the following manner: With an overload current in conductors 2, the cores 19 and 20 are drawn down equally, causing the lower end of bar 11 to engage with the stop 34, thus opening the contact 35 through the pivoted arm 36, and against the retarding action of the dash-pot 37, the lever being arranged to enable a definite time interval to elapse after stop 34 is engaged by the bar 11 before the contact 35 is opened. Thus momentary overloads will not affect the operation of the system but sustained overloads will result in the opening of the circuit breaker 40 by the release of the contact 35.

In Figure 2 there is shown an arrangement of magnetic coils 52 and 53 and current transformers 54 and 55, the same mechanical structure being employed as ilustrated in Figure 1. This arrangement is used on a two phase four wire circuit. In Figure 3 a single coil has been illustrated at 56 and a co-operative transformer at 57, designating the application of the system to a single phase circuit, the coil bieng mounted to surround the central bar 11. While current transformers have been shown in the various figures of the drawings it must be understood that where the currents in conductors 2 are relatively small, as would be the case where motor 1 is of small size, the current transformers may be dispensed with and coils 21, 22 and 25 designed so as to carry directly the load current to the motor, the windings of said coils being directly connected to the line conductors 2 so that the load current to the motor passes through them.

In Figure 4 there is shown a modification wherein the operating arm 10 carries a tooth sector 41 which engages with a gear member 42 having connected thereon a contact arm 43. In rotating the arm 43 contact is made with the various sections of the rheostat 44. This rheostat is of a wire wound type, designed to take the place of the carbon pile rheostat 7 in any case where such substitution may be desired.

In Figure 5 there is shown an application of the invention wherein movement of the operating arm 10, sector 41 and the gear member 42 causes the arm 43 to make contact with wires 44, 45 and 46 leading to respective contactors or magnetically operated switches 47, 48 and 49. The closing of these contactors in turn cuts out of circuit portions of the rheostat 50, which is contacted in series with the motor field 3. In this way a relatively large field current may be varied, as is found in motors of large size. In many cases one exciter may supply field current to several motors, and in such cases individual control of each motor cannot be effected by varying the exciter field as in Figure 1, but recourse must be had to the method shown in Figure 5.

In the operation of the control apparatus as a power factor regulator the downward and upward movement of the cores 19 and 20 and their attached members are relatively slight and not enough to permit of engagement of the levers 27 and 28 or the stop 34.

A feature of advantage connected with this control system is that it functions to open the main line circuit breaker by breaking contacts rather than by making contacts, since in the art of electrical control this is found to be the more dependable method.

In Figure 7 there has been disclosed a system of maintaining a predetermined power factor on an A. C. circuit serving induction or asynchronous motors having varying loads by means of a synchronous condenser. The power factor of induction motors varies in proportion to the load, the highest power factor existing at approximately the normal rated load of such motors and the lowest power factor existing at no load. If the excitation on the synchronous condenser 60 is so adjusted as to give a power factor of one in the A. C. circuit comprising the conductors 61, 62 and 63 when the induction motors 64 and 65 are operating at light load, the power factor will remain at unity or one so long as no load is placed on the motors 64 and 65. When a load is placed on the motors 64 and 65 their power factor will be increased and the power factor of the circuit including the conductors 61, 62 and 63 will be increased in proportion, causing the same to lead. If excitation on the synchronous condenser 60 is so adjusted as to give a power factor of one in the A. C. circuit 61, 62 and 63 when the motors 64 and 65 are operating at full load this power factor will remain at one just as long as full load is maintained on the motors 64 and 65. When the load is reduced on the motors 64 and 65 their power factor will be reduced, and the power factor of the circuit 61, 62 and 63 will be reduced in proportion. Therefore, it will be seen that with fixed excitation on the synchronous condenser 60 and varying loads on induction motors 64 and 65, the power factor in the A. C. circuit 61, 62 and 63 will vary greatly.

In Figure 7 a circuit 66 is taken from the exciter 67 and this circuit includes the coil 68 in series therewith, also variable resistors 69 and 70, the latter being connected in multiple. The magnetic strength of the coil 68 depends on the value of the resistance introduced into said circuit 66 by the variable resistors. With the excitation of the synchronous condenser 60 adjustable to give a predetermined leading power factor in the phase conductors or main supply circuit, and with the motors 64 and 65 at no load, as the load is applied to said motors the coils 71 and 71A will be energized in proportion to the load and the power factor of the motors 64 and 65 will increase. In other words the current taken by the motors 64 and 65 will lag behind the supply voltage to a less degree than it did when the motors were at no load. With increase in load current to said motors the resistance of the variable resistors 69 and 70 will be increased, decreasing the magnetic strength of the coil 68, increasing the resistance of resistor 72 and thereby lowering the exciter voltage, decreasing the exciting current of the synchronous condenser and permitting the current taken by said condenser to lead the supply voltage to a less degree thus compensating for the effect of increased power factor of the motors 64 and 65, thus maintaining a predetermined power factor in the main supply circuit. When load on the motors 64 and 65 is decreased their power factor is likewise decreased. In other words the current taken by the motors will lag to a greater degree than it did when the motors loaded. The decrease in load on said motors permits the resistance of variable resistors 69 and 70 to decrease, thereby increasing the strength of the coil 68, decreasing the resistance of the resistor 72, thereby raising the exciter voltage, increasing the exciter current of the synchronous condenser and permitting the current taken by said condenser to lead the supply voltage to a greater degree, thus compensating for the effect of decreased power factor of the motors 64 and 65, thus maintaining a predetermined power factor in the main supply circuit.

In Figure 8 I have shown a modification of my invention wherein it is applied in connection with a synchronous condenser in a similar manner to that described in the preceding paragraph except that instead of introducing the operating coils for the variable resistors in each individual induction motor circuit, as shown at 71 and 71' in Figure 7, I have employed but one coil 73, this being connected to the current transformer 74 located in one of the phase wires in the main supply circuit. This device is applied to a multi-phase circuit for controlling the power factor where an increase in current represents a leading current and a decrease in current represents a lagging current.

In view of the foregoing it will be seen that the present invention provides a simple automatically operating system for regulating the power factor characteristic of a dynamo-electric machine, whereby said characteristic may be maintained at a uniform point with fluctuating load conditions. Further, the apparatus provides protection against phase failure, protection against the failure of the exciter current and also protection against overload on the machine to which the system is applied, these features being carried out in a purely automatic manner without manual operations.

While I have described the preferred forms of the present invention, yet it is obvious that many additional modifications thereof will be apparent to those versed in the art and I therefore desire to cover by the present invention all of such modifications which may be said to fall within the scope of the above disclosure and the subjoining claims.

What is claimed is:

1. In a controlling system, an alternating current dynamo-electric machine, phase conductors leading to said machine, an exciter for energizing the field of said machine, said exciter being formed to include a field circuit, a variable resistance device situated in said field circuit, means responsive automatically to variations in the strength of the current passing through said conductors to actuate said resistance devices to vary the resistance of said field circuit, a controlling switch for governing the passing of current through said conductors to said machine, and means automatically responsive following predetermined actuation of said variable resistance device to effect the opening of said control switch when said phase conductors are overloaded.

2. In a controlling system, an alternating current dynamo-electric machine including a field winding, phase conductors leading to and from said machine, an exciter for the field winding of said machine, a field circuit for said exciter, a device situated in said field circuit for introducing a variable resistance therein, means responsive to the strength of the current passing through said phase conductors to increase and decrease the resistance introduced into said circuit by the actuation of said variable resistance, a main controlling switch for said machine and time control means movable after predetermined actuation of said variable resistance device to effect the opening of said main control switch when said phase conductors are overloaded.

3. In a controlling system, an alternating current dynamo-electric machine including a field winding, a plurality of phase conductors leading to said machine, an exciter for the field winding of said machine, a field circuit for said exciter, a device situated in said field circuit for introducing a variable resistance therein, means responsive to the strength of the current passing through said phase conductors to increase and decrease the resistance introduced into said field circuit by said device, a main control switch for said machine, a circuit for said switch, and means responsive to phase failure in one or more of said conductors to automatically actuate said control switch circuit to open said main switch.

4. In a controlling system, an alternating current dynamo-electric machine including a field winding, phase conductors leading to said machine, an exciter for the field winding of said machine, a field circuit for said exciter, an electro-magentic switch energized from said field circuit, a main controlling switch for said phase conductors and a circuit between said electro-magnetic switch and said main controlling switch operative to effect the automatic opening of the main controlling switch when the exciting current in the field circuit of said exciter falls below a predetermined value.

5. In an electrical control system, an alternating current dynamo-electric machine, including a field winding, phase conductors leading to said machine, a main control switch for said machine, an exciter for the field winding of said machine, said exciter including a field circuit, a variable resistance device connected in said exciter field circuit, means responsive to the current in said phase conductors to actuate said variable resistance device, thereby increasing or decreasing the resistance introduced into said exciter field circuit, means responsive to the current in said phase conductors to effect the opening of said main control switch when said phase conductors are overloaded, and means responsive to the current in said phase conductors to effect the opening of said main control switch when one of said phase conductors fails.

In testimony whereof I affix my signature.

ROY E. RICE.